US006977969B2

(12) United States Patent
Lee et al.

(10) Patent No.: US 6,977,969 B2
(45) Date of Patent: Dec. 20, 2005

(54) DIGITAL FM RECEIVER FOR RECOVERING FM DIGITAL DATA FRAME IN MOBILE COMMUNICATION SYSTEM

(75) Inventors: Kyung-Ha Lee, Seoul (KR); Young-Jin Kim, Songnam-shi (KR); Sung-Joo Kim, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 684 days.

(21) Appl. No.: 09/894,100

(22) Filed: Jun. 28, 2001

(65) Prior Publication Data

US 2002/0006170 A1      Jan. 17, 2002

(30) Foreign Application Priority Data

Jun. 28, 2000   (KR)   ................... 2000-35989

(51) Int. Cl.[7] .......................................... H04L 27/06
(52) U.S. Cl. .................. 375/316; 375/322; 375/365; 375/319; 714/822; 714/797
(58) Field of Search ............... 375/316, 319, 375/322, 365; 714/797, 822

(56) References Cited

U.S. PATENT DOCUMENTS

| 4,029,900 | A | * | 6/1977 | Addeo ..................... 375/365 |
| 4,821,292 | A | * | 4/1989 | Childress ................. 375/319 |
| 5,040,195 | A | * | 8/1991 | Kosaka et al. ............ 375/365 |
| 5,812,607 | A | * | 9/1998 | Hutchinson et al. ....... 375/322 |
| 5,987,639 | A | * | 11/1999 | Kivari et al. ............. 714/822 |
| 6,044,486 | A | * | 3/2000 | Underseth et al. ......... 714/797 |

FOREIGN PATENT DOCUMENTS

KR      P1999-003241      1/1999

* cited by examiner

*Primary Examiner*—Shuwang Liu
*Assistant Examiner*—Eva Zheng
(74) *Attorney, Agent, or Firm*—Dilworth & Barrese LLP

(57) ABSTRACT

There is provided a digital data receiver for recovering at least one message word signal from a digital data frame. The digital receiver includes a digital FM demodulator for receiving frequency modulated signals, and for demodulating a dotting sequence signal, a word sync signal and a message word signal of each sub-frame which is in digital data frame, a dotting detector for detecting a dotting sequence signal of at least one sub-frame among the signals demodulated by the digital FM demodulator, based upon a predetermined signal which is shorter than the length of each dotting sequence signal of the each sub-frame, detecting means for determining the termination of receiving of the digital data frame after the dotting detector detects the dotting sequence signal, and for detecting a new digital data frame followed by the digital data frame; and a message processor means for recovering a message word signal in the digital signal frame which is related to the dotting sequence signal detected by the dotting detector. A method for recovering at least one message word signal from a digital data frame is also disclosed.

15 Claims, 7 Drawing Sheets

DIGITAL FM RECEIVER FOR RECOVERING FM DIGITAL DATA FRAME IN MOBILE COMMUNICATION SYSTEM

PRIORITY

This application claims priority to an application entitled "DIGITAL FM RECEIVER FOR RECOVERING FM DIGITAL FRAME IN MOBILE COMMUNICATION SYSTEM" filed with the Korea Industrial Property Office on Jun. 28, 2000, and assigned U.S. patent application Ser. No. 2000-35989, the contents of which are hereby incorporated by reference.

BACKGROUND OF THE INVENTION

1. Field of the Invention

The present invention relates generally to an FM digital data receiver using IS-95 dual mode in which the receiver is selectively operable in either FM or code division multiple access (CDMA) in mobile communication systems. More particularly, the present invention, when continuously receiving a plurality of digital data frames in voice channel mode, relates to an FM digital data receiver for receiving a message without losing the message being repeated in said digital data frame, and a method for receiving the message.

2. Description of the Related Art

Analog mobile communication systems, such as AMPS (Advanced Mobile Phone Service) system, are still being used broadly in the region of North America. Meanwhile, the demand of digital mobile communication systems has also been gradually expanding. In fact, several mobile telephone operators have been gradually changing their analog mobile communication systems to digital mobile communication systems, with the result that some users can not communicate in some areas because different modes of communication are used. Therefore, there have been requests for a dual mode mobile phone being capable of communicating with both analog and digital mobile communication systems. The manufacturers or suppliers of mobile terminals have recently developed a dual-mode mobile telephone to meet the demand of the mobile telephone operators.

In a conventional analog mobile communication system, the demodulation of received FM communication signals is routinely performed using analog processing techniques. However, methods which allow analog communication signals to be processed using digital signal processing techniques have recently been developed. These techniques, such as quadrature detection processes, have enabled analog mobile communication systems to transmit both voice and character message data.

FIG. 1 is a block diagram showing the structure of a digital data receiver for AMPS adapted for dual mode operation.

Referring to FIG. 1, digital data receiver 1 includes an antenna 10 receiving I and Q channel information signals transmitted from a dual mode transmitter (not shown), and analog receiver 11 processing said I and Q channel information signals received through the antenna 10. Baseband I and Q signals being processed in said analog receiver 11 are provided to analog to digital converter (ADC) 12 through each output line 18 and 19 of the receiver 11. Within the ADC 12, baseband I and Q signals are digitized to form 8-bit in-phase (I) and 8-bit quadrature-phase (Q) samples. The 8-bit I and Q samples are input to I/Q FM demodulator 13. Within the I/Q FM demodulator 13, baseband I and Q signals are converted into demodulated frequency signals. The demodulated frequency signals are provided to both an audio decimation filter 15, and to a data recovery unit 14, respectively.

After the demodulated frequency signals are filtered within said audio decimation filter 15, the demodulated frequency signals are provided to a vocoder (not shown) for recovery of the received audio information. Contemporaneously, the data recovery unit 14 extracts symbol synchronization and message word signals from the demodulated frequency signals. These extracted signals are decoded by the data recovery unit 14, and then provided to a microprocessor 17. The microprocessor 17 displays the inputted message word signals on a display device (not shown).

FIG. 2 is a block diagram of the structure of a message synchronization circuit incorporated into the data recovery unit 14 in order to synchronize the symbols. An exemplary example of a message synchronization circuit is set forth in Korean Patent Application Ser. No. 1999-003241, filed Jun. 25, 1997, which is assigned to the assignee of this application and is incorporated by reference.

FIG. 3 illustrates the structure of a digital data frame for transmitting data over a forward voice channel (hereinafter FVC) in an AMPS system.

Referring to FIG. 3, a digital data frame includes a total of eleven sub-frames, and each sub-frame is divided into three signal parts. The three signal parts are known as a given dotting sequence signal, a given word sync signal and a message word signal, respectively, wherein each signal part is represented by a plurality of symbols or bits. Especially, the dotting sequence signal of the first sub-frame in the digital data frame comprises a longer signal than the dotting sequence signal of the rest of the sub-frames. Namely, the dotting sequence signal of the first sub-frame is composed of 101 symbols in which 1 and 0 are repeated, while the dotting sequence signal of the rest of the sub-frames are composed of 37 symbols in which are repeated 1 and 0. The word sync signal included in all the sub-frames in the digital data frame is composed of 11 symbols, having the same pattern, such as 11100010010. The message word signal following the dotting sequence signal and word sync signal in each sub-frame of the digital data frame is composed of 40 symbols. The message word signal is generated by a BCH (Boss-Chaudhuri-Hocquenghem) code method, which is used to code data composed of 28 symbols. The message word signal included in each sub-frame is the same. The dotting sequence signal and word sync signal in each sub-frame allows a mobile telephone to synchronize the message word signal that is received continuously.

The structure of the digital data frame of FIG. 3 was adopted by the TIA (Telecommunication Industry Association) as a standard structure, and the receiving technology for receiving the digital data frame is described in U.S. Pat. No. 5,812,607, which was issued to James A. Hutchison et al. ("HUTCHISON '607"). However, the receiving technology described in the '607 patent has been developed under the circumstance that if the space of the received digital data frame is broad enough, and message word signal must be detected at the start time of the digital data frame. Therefore, if the radio channel was in a bad condition, the provability of detecting of the message word signal would decrease. Furthermore, with the increased demand for transmission of short-message service lately, there have been problems in cases of sending the short-message, which usually consists of 40 symbols, by using only one digital data frame. Therefore, to solve these kinds of problems, several U.S. mobile operators, such as SPRINT, have alternatively used the method of transmitting continuously a plurality of digital data frames. Namely, if a short-message has more than 40 symbols, they are divided and allotted to a plurality of digital data frames, and then transmitted continuously with the plurality of digital data frames. In the case of continuously transmitting a plurality of digital data frames, a mobile phone should successfully receive the plurality of digital data frames transmitted continuously. However, the receiving technology of Hutchison '607 suffers the problems of not receiving accurately the digital data frames because of its use of the method described below with respect to FIG. 4.

Referring to FIG. 4, the receiving method of a digital data frame with respect to Hutchison '607 is set forth. The digital data frame transmitted from the dual mode transmitter (not shown) is synchronized in the symbol sync circuit and the synchronized symbols are recovered within the data recovery unit 14 of FIG. 1. The synchronized and recovered symbols in the data recovery unit 14 are provided to a dotting signal detector (not shown), and the dotting signal detector detects a dotting sequence signal from the received symbols. If a specific pattern of signal, for example a dotting sequence signal composed of 32 symbols in which 1 and 0 repeat, is detected by the dotting signal detector, a control unit (not shown) operates a timer for a predetermined time. Generally, the timer sets a time corresponding to the length of a digital data frame. Therefore, if the dotting sequence signal is detected and the timer is working, message word registers (not shown) in the data recovery unit 14 store each message word signal of each sub-frame in the digital data frame related to the detection of the dotting sequence signal. If the timer expires, the message word signals are demodulated, and the dotting signal detector repeats the detection of the next received digital data frame.

FIG. 5 shows a problem in the case of using the method of the FIG. 4.

Referring to FIG. 5, there is shown the case in which a dotting sequence signal is detected in the second sub-frame because the dotting signal detector (not shown) in the data recovery unit 14 of FIG. 1 could not detect the dotting sequence signal of the first sub-frame in a digital data frame due to sudden weakness of radio channel strength. In this case, the timer operates for the time corresponding to the length of the digital data frame from the time when the dotting signal detector detects the dotting sequence signal. Therefore, if a plurality of digital data frames are received continuously, the timer terminates during receiving of a digital data frame following the first digital data frame. In the above case, the digital receiver can not be notified when the receiving of the first digital data frame ends. The problem lies in that the digital receiver can not separate the first digital data frame from a next digital data frame that includes a different message word signal. Therefore, even though the digital data receiver receives a next digital data frame having a different message word signal, it determines to receive the same digital data frame continuously so that the message word register stores a different message word signal. As a result, it negatively influences the recovering of the message word signal, and may even prevent receiving next digital data frames.

SUMMARY OF THE INVENTION

It is therefore an object of the present invention to provide a method of and means for accurately detecting the start and end time of digital data frames continuously received by a digital data FM receiver to demodulate a received FM digital data signal in a mobile communication system.

It is another object of the present invention to provide a means for determining the end of receiving of a first digital data frame, and a means for detecting whether or not a next digital data frame is received after the first digital data frame.

It is still another object of the present invention to provide a long dotting sequence signal means for detecting a signal which is shorter than the dotting sequence signal of the first sub-frame in the received digital data frame, and which is longer than each dotting sequence signal of the rest of the sub-frames, in order to detect whether the next digital data frame is received after the received first digital data frame.

It is still a further object of the present invention to provide a frame end counter for decreasing a value from a predetermined value whenever symbols transmitted from a symbol sync circuit are received, and for resetting to a predetermined value when the predetermined value reaches zero or the word sync detecting means detects a word sync signal of a sub-frame that is related to the detection of the dotting signal sequence signal, after the dotting signal detector detects the dotting sequence signal.

It is still another object of the present invention to provide, when the dotting signal detector detects a dotting sequence signal and word sync detector detects a word sync signal, a message word block counter for counting whenever message word signals of sub-frames are received, and a message accumulator for storing a plurality of message word signals of sub-frames included in the digital data frame which is related to the detection of the dotting sequence signal.

It is still a further object of this invention to provide a method for improving the receiving ability as recovering message word signals of each sub-frame in the digital data frame after the number of message word signals are accumulated to the highest level. The maximum number of message word signals to be received is 11 because the total sub-frames is 11.

According to an aspect of the present invention, there is provided a digital receiver for recovering at least one message word signal from a digital data frame. The digital receiver includes;

a dotting signal detector, which is provided symbols of said signals demodulated by said digital FM demodulator, for detecting a dotting sequence signal of at least one sub-frame by determining whether the symbols corresponding to the dotting sequence signal are continuously detected more than a determined value that is shorter than the length of each dotting sequence;

a long dotting sequence signal detector, which is provided symbols of said signals demodulated by said digital FM demodulator, for detecting a long dotting sequence signal by determining whether symbols corresponding to dotting sequence signal are continuously detected more than a determined value that is longer than the dotting sequence signal of the other sub-frames, but shorter than the length of the dotting sequence signal of the first sub-frame of the digital data frame after said dotting signal detector detects dotting sequence signal of at least one sub-frame;

a word sync detector, which is provided symbols of said signals, for detecting word sync signal of each sub-frame;

after detecting at least one said dotting sequence signal, frame ending counter for determining the termination of receiving of the digital data frame when a predetermined total is reached by increasing or decreasing a determined value if each symbol of the digital data frame is detected, and resetting to a predetermined value if the word sync signal is detected before reaching to the predetermined total; and after said dotting signal detector detects the dotting signal and said word sync detector detects the word sync signal, a message processor means including a message accumulator that detects and stores at least one message word signal of the sub-frame from the demodulated signals, for recovering the message word signal from the stored the message word signals until receiving of the digital data frame is terminated.

The method for recovering at least one message word signal from a digital data frame, being the same signal comprising the steps of:

(a) storing at least one message word signal of the digital data frame;

(b) detecting the dotting sequence signal of the digital data frame, and then counting the number of symbols whenever each symbol is inputted;

(c) recovering the message word signal from all of the stored message word signals at a time of detection when symbols corresponding to the dotting sequence signal are continuously detected more than a determined value that is longer than the dotting sequence signal of the other sub-frames, but shorter than the length of the dotting sequence signal of the first sub-frame of the digital data frame, and then returning to the step (b);

(d) recovering the message word signal from all the detected message word signals at a time of reaching when a counting value of the symbols is reached a determined value, and returning to the step (b), and initializing the counting value of the symbol if the word sync signal of the digital data frame is detected before reaching to the determined value;

(e) if the word sync signal is detected, storing the message word signal associated with the detection of the dotting sequence signal of the digital data sub-frame, and increasing counting value of message word block by 1; and (f) returning to the step (b) if the counting value is not reached to the determined value, and after recovering the message word signal from the stored message word signals at the time of detection when the counting value reaches the determined value, and then returning to the step (b).

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

A preferred embodiment of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 6:
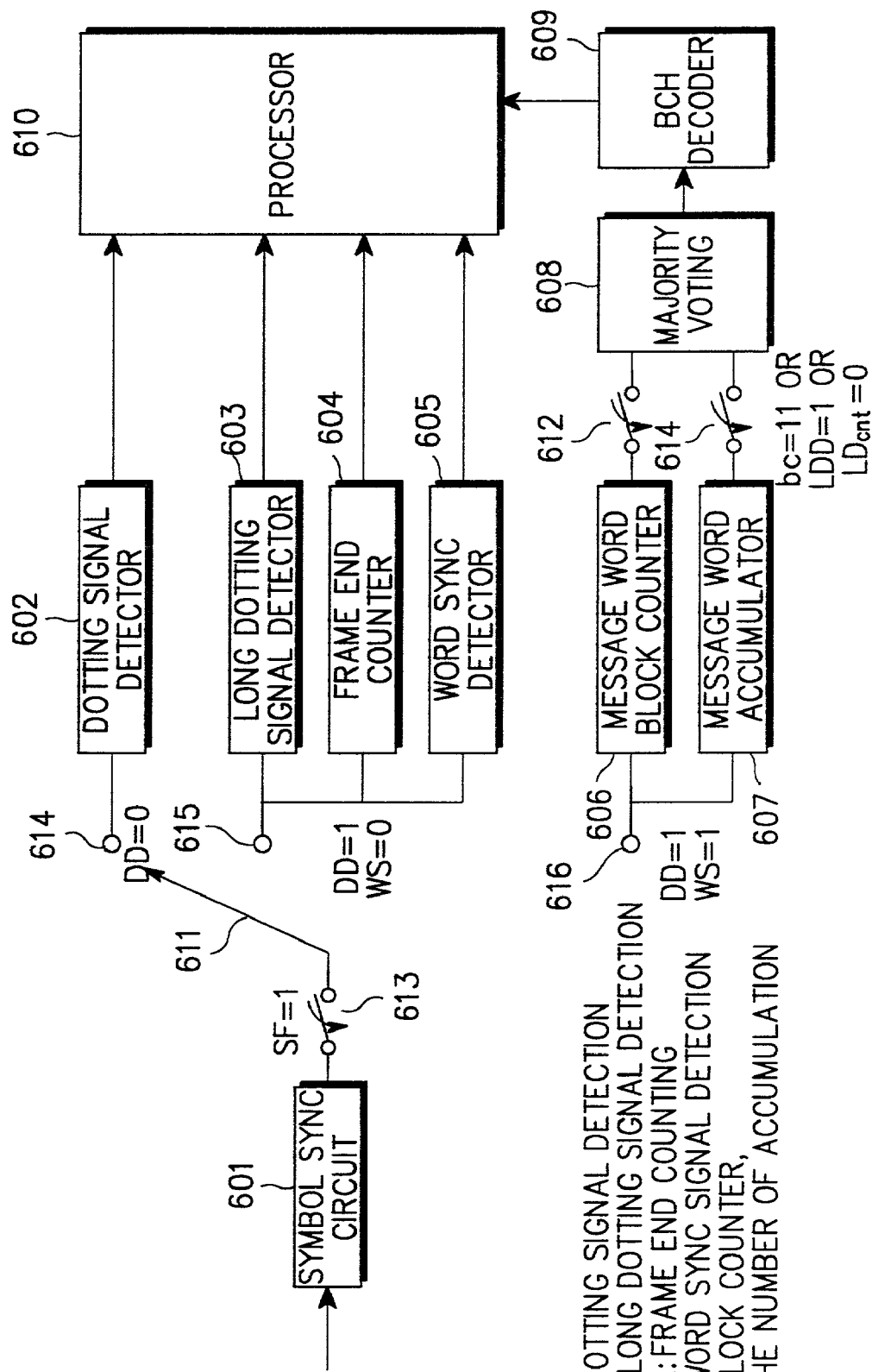
FIG. 6 is an preferred embodiment of a digital FM receiver for processing digital data frames received continuously according to the present invention.

FIG. 6 is a block diagram illustrating a digital FM receiver having a data recovery means incorporated in the digital FM receiver according to a preferred embodiment of the present invention.

Figure 1:
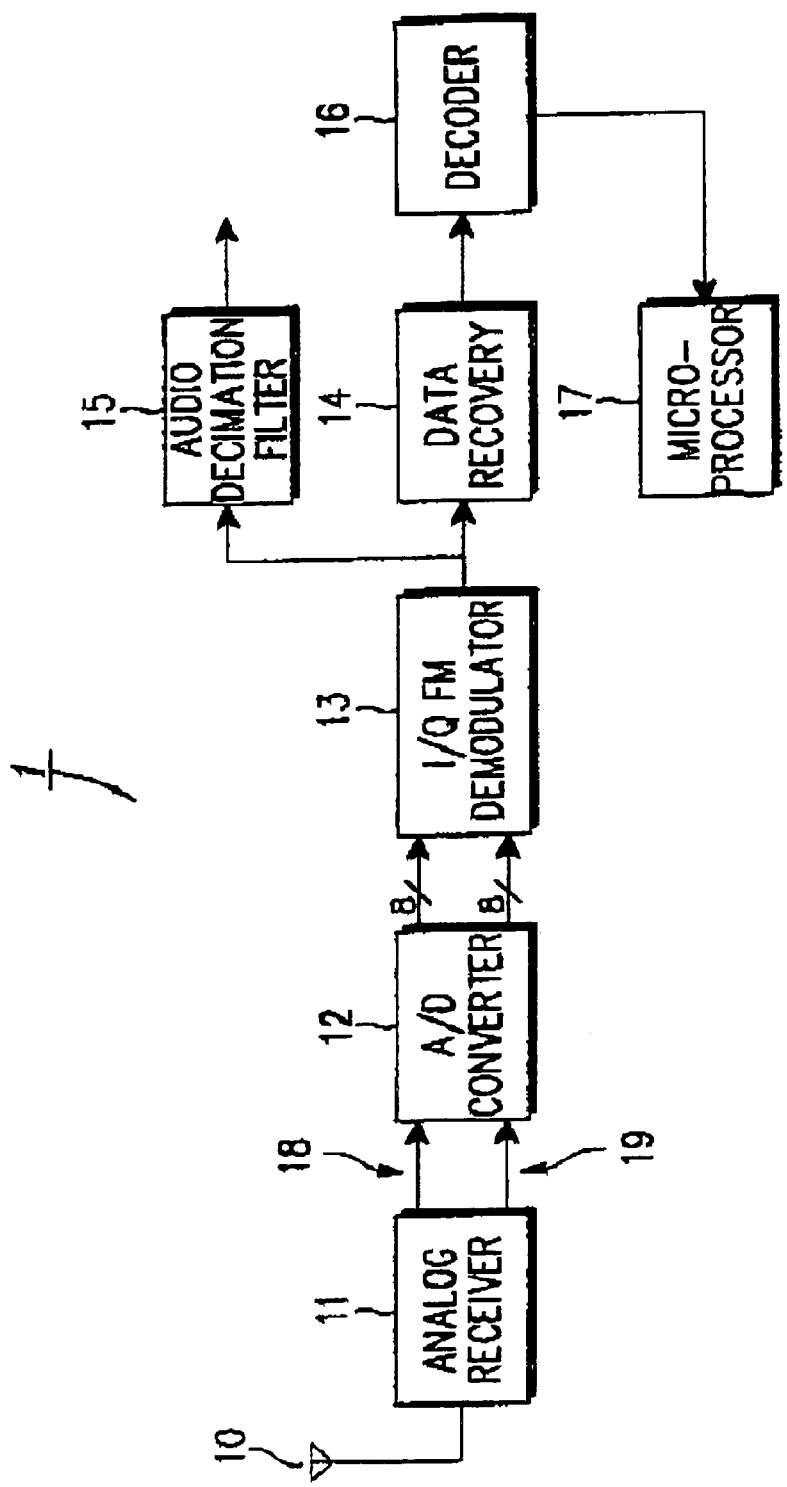
FIG. 1 is a block diagram of a digital FM receiver incorporated in a dual mode digital communication.
Figure 2:
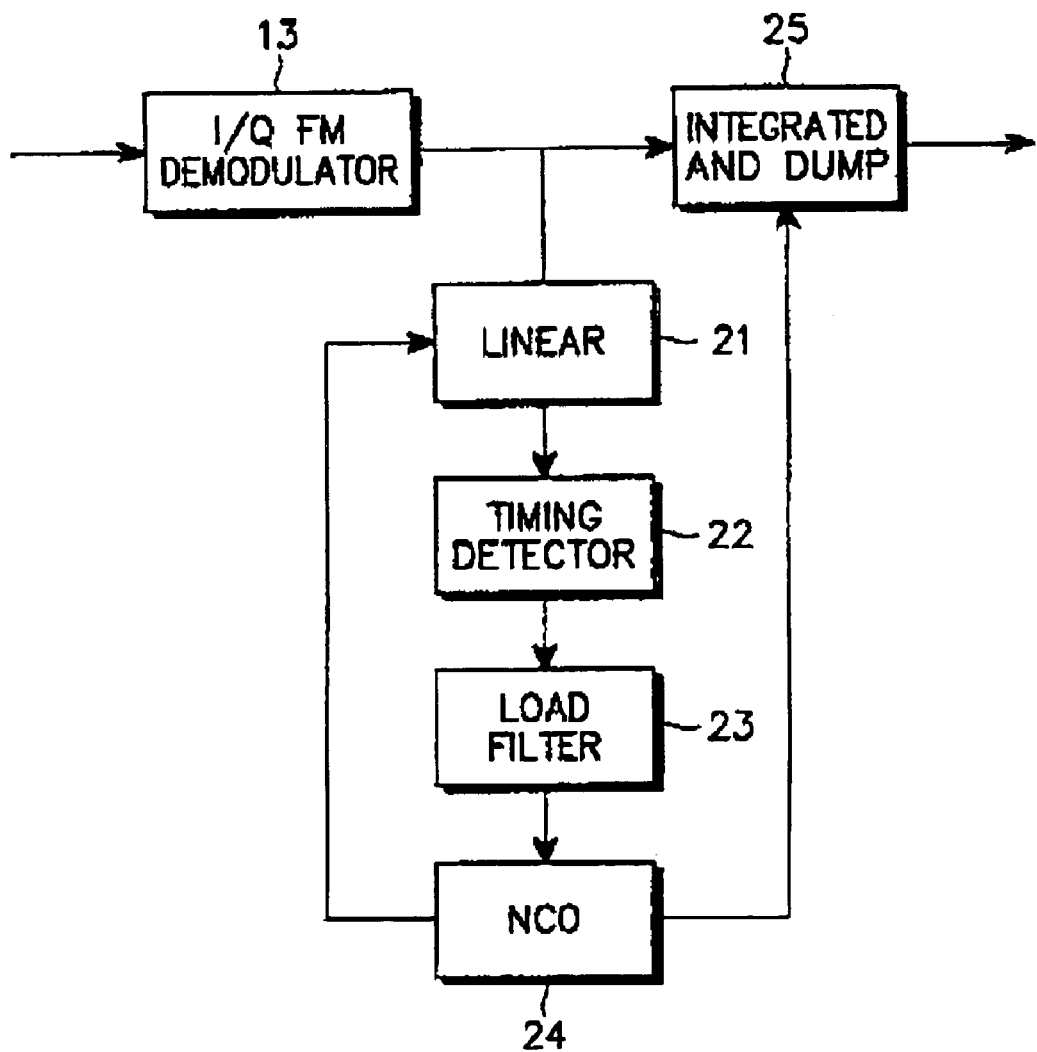
FIG. 2 is a block diagram of a symbol sync circuit which is incorporated in the digital FM receiver of FIG. 1.
Figure 3:
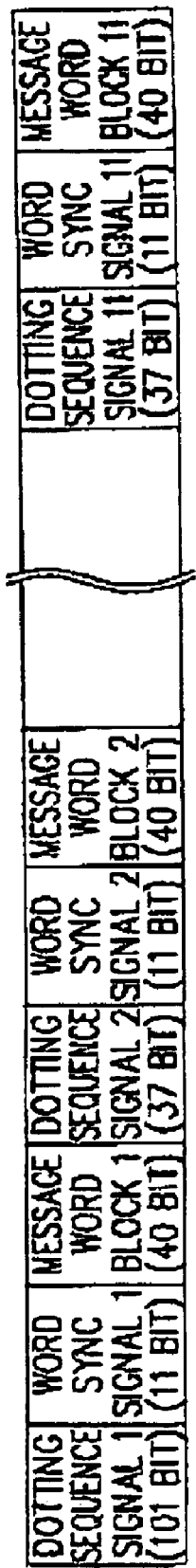
FIG. 3 illustrates the structure of a digital data frame received by the digital FM receiver of FIG. 1 during forward voice channel (FVC) mode.
Figure 4:
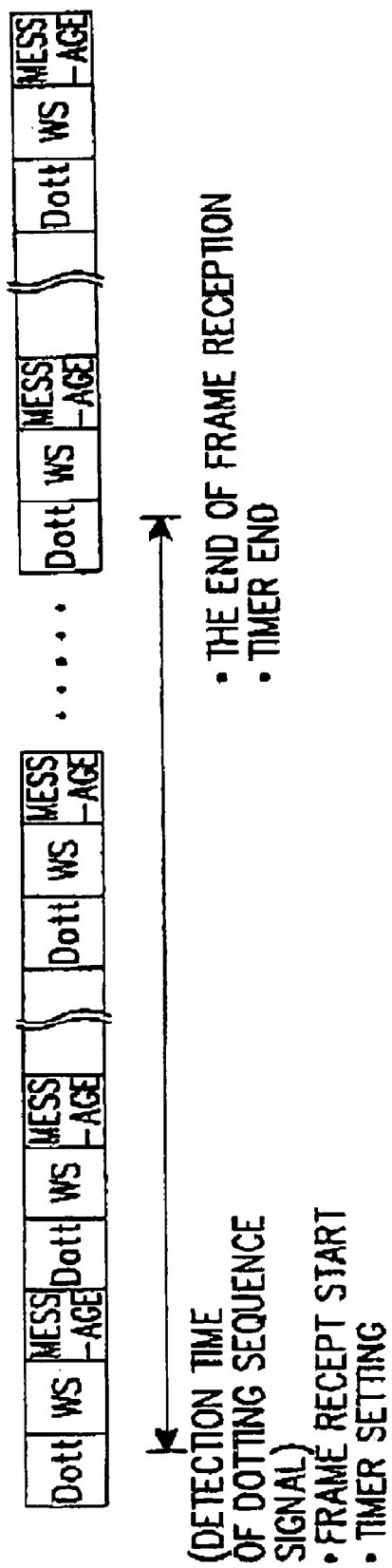
FIG. 4 illustrates a digital data frame processed according to prior methods and received by the digital FM receiver during forward voice channel (FVC) mode.
Figure 5:
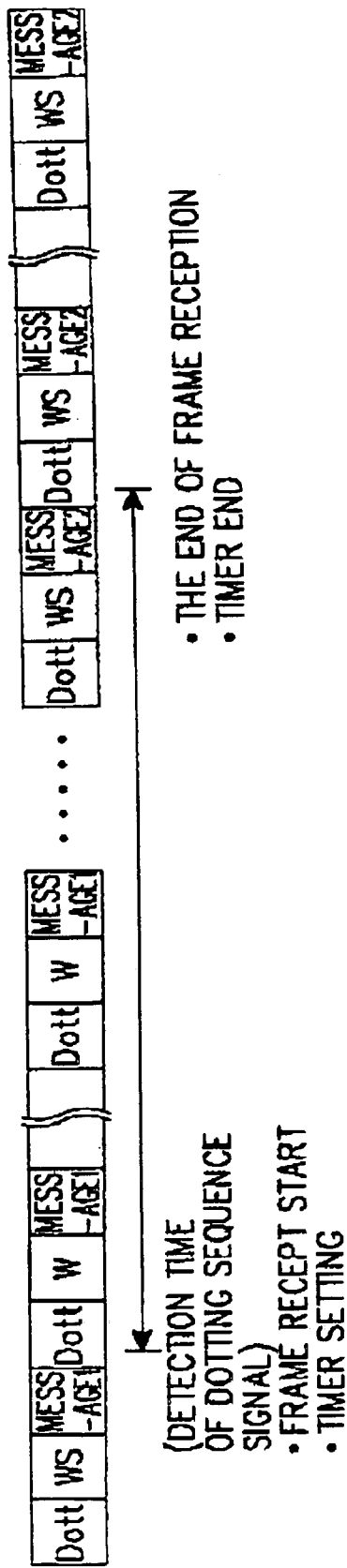
FIG. 5 is an example of showing the detection of the dotting sequence signal delayed in a prior art processing digital data FM receiver received by the digital FM receiver during forward voice channel (FVC) mode.

Referring to FIG. 6, the dotting sequence signal, word sync signal and message word signal of each sub-frame, consisting of a plurality of symbols in the digital data frame that are demodulated by I/Q FM demodulator 13 of FIG. 1, are provided to a symbol sync circuit 601. The symbol sync circuit 601 recovers clock information from the demodulated signals, and synchronizes each symbol by using the recovered clock information. In addition, the symbol sync circuit 601 recovers the value of the symbol to be received by accumulating a plurality of sampled signals during the interval of a symbol. A detailed explanation on this is described in previously mentioned Korean Patent Publication Ser. No. 1999-3241.

At the time when symbols are synchronized and recovered by the symbol sync circuit 601, a processor 610 controls the operation of a switch 613, which is closed. The processor 610 also can control the operation of each apparatus without switch 613. However, the preferred embodiment using switch 613 will be explained below. The processor 610 also controls the switch 611 to be closed to node 614, in order to detect a dotting sequence signal as soon as the switch 613 is closed. The dotting signal detector 602 connected to node 614 accumulates a predetermined number of symbols, for example up to 32, related to dotting sequence signal that is provided through switch 613. If the accumulated 32 symbols have a pattern of repeated "1s" and "0s", corresponding to the characteristics of the dotting sequence signal, the dotting signal detector determines whether the symbol pattern corresponds to a dotting sequence signal or not. If the accumulated symbols correspond to a dotting sequence signal, the dotting signal detector informs the processor 610. Once dotting signal detector 602 connected to node 614 detects a dotting sequence signal, the processor 610 closes switch 611 to node 615. Node 615 is connected to a long dotting signal detector 603, frame end counter 604 and word sync detector 605, respectively. Once the switch 611 is closed to the node 615 so that symbols are provided to the long dotting signal detector 603, the long dotting signal detector 603 accumulates the inputted symbols up to a predetermined number of symbols, for example 42. If the accumulated 42 symbols have a symbol pattern of repeated "1s" and "0s", the long dotting signal detector 603 determines whether the symbol pattern corresponds to a long dotting sequence signal or not. If the symbol pattern corresponds to the long dotting sequence signal, the long dotting signal detector 603 informs the processor 610. After being informed, the processor 610 directs the message word accumulator 607 to recover the message word signal from the total message word signals stored by a time the accumulator 607 is informed. Since detection of the long dotting sequence signal means that the subsequent or new digital data frame which follows the digital data frame is being received, the message word signal should be recovered from the total of message word signals stored in the message word accumulator 607 at the time of detection of the long dotting sequence signal. The detection of the arrival of a new digital data frame is performed by long dotting sequence signal detector 603. However, the dotting sequence signal detector 602 also may be able to detect the long dotting sequence signal.

When the dotting signal detector 602 detects the dotting sequence signal, the frame end counter 604 resets to a predetermined counter value described hereafter. When the switch 611 closes to node 615, the frame end counter 604 decreases by 1 from the predetermined value as each symbol is provided to the frame end counter 604. If the frame end counter reaches zero, the frame end counter determines that the reception of the current digital data frame is terminated and informs the processor 610. With the termination of the reception of the digital data frame, the processor 610 directs the message word accumulator 607 to recover the message word signal from the total of message word signals stored by a time the digital data frame is terminated. Here, the predetermined value is designated to a specific value, for example 312, that is smaller than the total number of bits (i.e. 1032) of the digital data frame. Once the switch 611 is closed to node 615 and symbols are provided from symbol sync circuit 601, the word sync detector 605 accumulates the inputted symbols up to a predetermined number such as 11. The word sync detector 605 determines whether the inputted symbol pattern is a word sync signal or not. If the inputted 11 symbols have a specific pattern (i.e. 11100011001), the word sync detector 605 informs the processor 610. When the dotting signal detector 602 detects the dotting sequence signal, and the word sync detector 605 detects the word sync signal, the processor 610 controls switch 611 to be closed to node 616. Node 616 is connected to a message word block counter 606 and a message word accumulator 607, respectively. Once the switch 611 is closed to node 616 and symbols corresponding to a message word signal are provided from symbol sync circuit 601, the message word accumulator 607 stores the inputted symbols up to a predetermined value such as 40. The message word block counter 606 also counts how many the message word signals are stored in the message word accumulator 607. That is, during receiving a digital data frame, the message word accumulator 607 can check how many sub-frames are received based upon the detection of the message word signal included in every sub-frame. If the counting value of the message word block counter 606 reaches a determined value, such as 11 corresponding to the total number of sub-frames included in the digital data frame, the message word signals stored in the message word accumulator 607 is recovered. In contrast to the prior art that recovers the message word signal by accumulating fewer message word signals after detecting the word sync signal, the preferred embodiment of the present invention accumulates more message word signals so that correction of the recovered message is improved.

Therefore, this invention provides, while the digital data frames are transmitted from a transceiver, a digital receiver for recovering at least one message word signal from a digital data frame in a mobile communication system. To achieve this, the present invention includes a frame end counter 604 to determine the termination of receiving of the current digital data frame, and a long dotting signal detector 603 to determine whether or not a next digital data frame is received following the first received digital data frame. This invention further includes a message word block counter 606 for counting the message word signals as message word signals of the sub-frames are received in a digital data frame.

Once the message word block counter 606 stores 40 symbols, and the message word accumulator 607 is increased by 1, the processor 610 controls the switches 612 and 614 to be closed to a majority voting means 608. The symbols are recovered by the majority voting means 608 and BCH decoder 609 and provided to the processor 610 for displaying the message.

The method of recovering at least one message word signal from the digital data frame will now be explained in detail according to a preferred embodiment of this invention. It is noted, as described above, that the digital data frame includes a plurality of serial sub-frames. Each sub-frame consists of three signals, i.e. a given dotting sequence signal, a given word sync signal and a message word signal. Each signal is modulated by frequency in a mobile communication system and then is transmitted from the mobile communication system. In addition, the length of the dotting sequence signal of the first sub-frame in said digital data frame is longer than that of the dotting sequence signals of the other sub-frames. The word sync signal and the message word signal included in said each sub-frame have the same signal pattern and same length.

Figure 7:
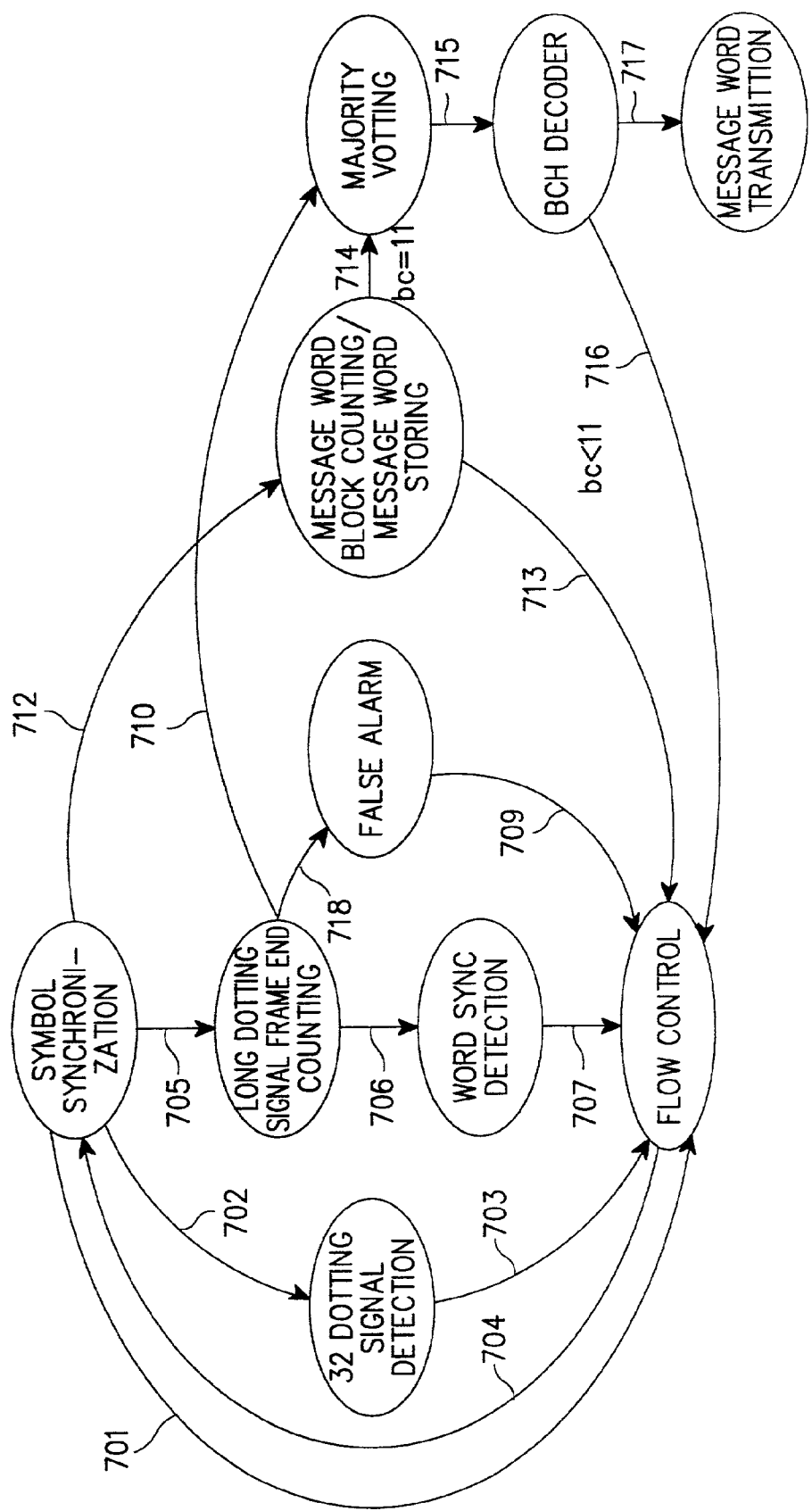
FIG. 7 illustrates the steps for processing digital data frames received continuously in the digital FM receiver of FIG. 6 according to the present invention.

FIG. 7 illustrates, when digital data frames transmitted from a transceiver are continuously received by the mobile terminal, the steps of detecting the starting of receiving or the end of the digital data frame, and the step of recovering at least one message word signal from the digital data frame.

Referring to FIG. 7, symbols transmitted from symbol sync circuit 601 of FIG. 6 are synchronized and the value of the symbols are recovered in steps 701 and 704. That is, all sample values of symbols inputted from the I/Q FM demodulator are repeatedly synchronized and recovered in steps 701 and 704. If a symbol is synchronized and recovered, one of a selected step among steps 702, 705 and 712 is performed. The dotting signal detector 602 of FIG. 6 operates to accumulate synchronized and recovered symbols inputted from the symbol sync circuit 601, and detects the dotting sequence signal of at least one sub-frame from a plurality of the sub-frames included in the digital data frame in step 702. If the dotting signal detector 602 detects at least one dotting sequence signal in a sub-frame based upon a predetermined signal which is shorter than the length of dotting sequence signal of the rest sub-frames, the processor 610 is informed in step 703. Once the dotting signal detector 602 detects at least one dotting sequence signal, the switch 611 is closed from node 614 to 615. The counter 604 of FIG. 6 counts the number of symbols inputted from the symbol sync circuit 601, and at the same time the long dotting signal detector 603 detects a long dotting sequence signal, which is shorter than the length of the dotting sequence signal of the first sub-frame in the digital data frame, and is longer than the length of the dotting sequence signal of the rest of sub-frames in the digital data frame in step 705. If the long dotting sequence signal is not detected and the counting number of the frame end counter 604 is not zero in step 705, the word sync detector 605 detects a word sync signal in the sub-frame in step 706. Once the word synch signal is detected in step 706, the word sync detector 605 informs the processor 610 in step 707. If either the long dotting sequence signal is detected by the dotting signal detector 602 or the counting number of frame end counter 604 reaches zero, reception of a digital data frame is terminated. Additionally, if the counting number of message word block counter 606 reaches zero, an error message is generated to show that there has been an error during reception of the digital data frame in step 708.

If the message word block counter 606 is at zero, then no message word signals of the sub-frames in the digital data frame have been detected. The error message generated in step 708 is sent to the processor 610 in step 709. Once the long dotting sequence signal is detected by the long dotting signal detector 603 in the step 705 or the counting number of both the frame end counter 604 and message word block counter 606 reaches zero, the message word signal stored in the message word accumulator 607 is provided to a majority voting means 608 and BCH decoder 609 for creating a reconstructed word in steps 710 and 715. The reconstructed message word signal in the step 710 and 715 is provided to the processor 610 and displayed or output on a display means or by an earphone (not shown) in step 717.

Meanwhile, if the word sync signal is detected in step 706, the message word signal of the sub-frame associated with the detection of the dotting sequence signal is stored, and the counting number of message word block counter 606 is increased by "one" in step 712. If the counting number of the message word block counter 606 reaches a predetermined value, for example 11 corresponding to the number of sub-frames included the digital data frame, the message word signal stored in the message word accumulator 607 is processed in majority voting means 608 in step 714. In the case where the counting number of message word block counter 606 does not reach a predetermined value in step 712, the next message word signal of the rest of the sub-frames in the digital data frame associated with the detection of the dotting sequence signal may be stored the message word accumulator 607, and the counting of the message word block counter 606 is increased by 1 in step 713. If there is a BCH decoding error in step 715, the processor 610 is informed, and the above steps are repeated beginning from the first step.

The above description of the preferred embodiments is provided to enable any person skilled in the art to make or use the present invention. Various modifications to these embodiments will be readily apparent to those skilled in the art, and the generic principles defined herein may be applied to other embodiments. For example, the means for detecting the dotting sequence signal, the counters and accumulator are accomplished by the use of digital signal processing technology. Thus, the present invention is not intended to be limited to the embodiments shown herein but is to be accorded the widest scope consistent with the principles and novel features disclosed herein.

What is claimed is:

1. A digital data receiver for recovering at least one message word signal included in a received digital data frame which consists of a plurality of sub-frames, each sub-frame including a given dotting sequence signal, a given word sync signal and a message word signal in which each signal is represented by a plurality of symbols and modulated by frequency in a mobile communication system, wherein a dotting sequence signal of the first sub-frame is longer than dotting sequence signals of the rest of the sub-frames, and the word sync signal and message word signal of each sub-frame consist of the same length and pattern, the digital data receiver comprising;
a digital FM demodulator for receiving frequency modulated signals, and for demodulating a dotting sequence signal, a word sync signal and a message word signal of each sub-frame included in said digital data frame;
a dotting signal detector, which is provided with symbols of said signals demodulated by said digital FM demodulator, for detecting a dotting sequence signal of at least one sub-frame by determining whether the symbols corresponding to the dotting sequence signal are continuously detected more than a specific value that is shorter than the length of each dotting sequence signal;
a word sync detector, which is provided with symbols of said demodulated signals, for detecting the word sync signal of each sub-frame;
a frame end counter for counting the symbols received and determining termination of the received digital data frame by increasing or decreasing a counting number whenever each of the symbols is detected until the counting number reaches a predetermined number, and for resetting to a initial number if the word sync signal is detected prior to reaching the predetermined number; and
a message processor means including a message word accumulator that detects and stores at least one message word signal of the sub-frame from the demodulated signals, for recovering the at least one message word signal from message word signals stored in said message word accumulator until receiving of the digital data frame is terminated.

2. The digital data frame receiver as recited in claim 1, wherein the frame end counter determines termination of the received digital data frame after the dotting signal detector detects at least one dotting sequence signal.

3. The digital data receiver as recited in claim 1, wherein the message processor means recovers the message word signal after the dotting signal detector detects at least one dotting sequence signal and the word sync detector detects the word sync signal.

4. The digital data receiver as recited in claim 1, wherein said message processor means further comprises a message word block counter for counting the number of detected message word signals included in each sub-frame of the digital data frame from the demodulated signals, and for recovering a message word signal from message word signals stored in said message word signal accumulator when the number of the detected message word signals reaches a determined value.

5. The digital data receiver as recited in claim 1, further comprising a long dotting sequence signal detector, which is provided with symbols of said signals demodulated by said digital FM demodulator, for detecting a long dotting sequence signal by determining whether symbols corresponding to dotting sequence signal are continuously detected more than a determined value that is longer than the dotting sequence signal of the other sub-frames, but shorter than the length of the dotting sequence signal of the first sub-frame of the digital data frame after said dotting signal detector detects the dotting sequence signal of at least one sub-frame.

6. The digital data receiver as recited in claim 5, wherein said message processor means recovers the one message word signal from message word signals stored in said message word accumulator until the long dotting sequence signal is detected by said long dotting sequence signal detector.

7. The digital data receiver as recited in claim 6, wherein said message processing means further comprises a message word block counter to count the number of detected message word signals of each sub-frame from the demodulated signals, and for recovering a message word signal from message word signals stored in said message word accumulator until the number of detected message word signals reaches a determined value.

8. A digital data receiver for recovering at least one message word signal included in a received digital data frame which consists of a plurality of sub-frames, each sub-frame including a given dotting sequence signal, a given word sync signal and a message word signal in which each signal is represented by a plurality of symbols and modulated by frequency in a mobile communication system, wherein a dotting sequence signal of the first sub-frame is longer than dotting sequence signals of the rest of the sub-frames, and the word sync signal and message word signal of each sub-frame consist of the same length and pattern, the digital data receiver comprising:

a digital FM demodulator for receiving frequency modulated signals, and for demodulating a dotting sequence signal, a word sync signal and a message word signal of each sub-frame included in said digital data frame;

a dotting signal detector, which is provided with symbols of said signals demodulated by said digital FM demodulator, for detecting a dotting sequence signal by determining whether the symbols corresponding to the dotting sequence signal are continuously detected more than a first specific value that is shorter than the length of each dotting sequence signal, and detecting a first dotting sequence signal of a new digital data frame by determining whether the symbols corresponding to the dotting sequence signal are continuously detected more than a second specific value that is longer than the dotting sequence signal of the other sub-frames, but shorter than the length of the dotting sequence signal of the first sub-frame of the digital data frame;

a word sync detector, which is provided with symbols of said demodulated signals, for detecting the word sync signal of each sub-frame;

a frame end counter for counting the symbols received which increases or decreases a counting number whenever each of the symbols is detected after the dotting sequence signal detection, for determining termination of the received digital data frame when the counting number reaches a predetermined number, and for resetting the counting number if the word sync signal is detected prior to reaching the predetermined number, and for determining termination of the received digital data frame through a way that counting number increased or decreased by number whenever each symbol is detected after the dotting sequence signal detection reaches a predetermined number, and for resetting the counting number to a initial number if the word sync signal is detected prior to reaching the predetermined number; and a message processor means including a message word signal accumulator that detects and stores at least one message word signal of the sub-frame from the demodulated signals, for recovering the at least one message word signal from message word signals stored in said message word signal accumulator until receiving of the digital data frame is terminated or the first dotting sequence signal of the new digital data frame is detected by said dotting signal detector.

9. The digital data frame receiver as recited in claim 8, wherein the frame end counter determines termination of the received digital data frame after the dotting signal detector detects at least one dotting sequence signal.

10. The digital data receiver as recited in claim 9, wherein the message processor means recovers the message word signal after the dotting signal detector detects at least one dotting sequence signal and the word sync detector detects the word sync signal.

11. A digital data receiver for recovering at least one message word signal included in a received digital data frame which consists of a plurality of sub-frames, each sub-frame including a given dotting sequence signal, a given word sync signal and a message word signal in which each signal is represented by a plurality of symbols and modulated by frequency in a mobile communication system, wherein a dotting sequence signal of the first sub-frame is longer than dotting sequence signals of the rest of the sub-frames, and the word sync signal and message word signal of each sub-frame consist of the same signal length and pattern, the digital data receiver comprising:

a digital FM demodulator for receiving frequency modulated signals, and for demodulating a dotting sequence signal, a word sync signal and a message word signal of each sub-frame which is in said digital data frame;

a long dotting sequence signal detector for detecting a dotting sequence signal of a first sub-frame by determining whether symbols corresponding to the dotting sequence signal are continuously detected more than a determined value that is longer than the dotting sequence signal of the other sub-frames, but shorter than the length of the dotting sequence signal of the first sub-frame of the digital data frame;

a frame end counter for counting the symbols received and determining termination of the received digital data frame by increasing or decreasing a counting number whenever each of the symbols is detected until the counting number reaches a predetermined number, and for resetting to an initial number if the word sync signal is detected prior to reaching the predetermined number; and a message processing means having a message word accumulator that detects and stores the message word signal of at least one sub-frame from the demodulated signals, and for recovering the message word signal from the message word signals stored in said message word accumulator after the long dotting sequence signal is detected by said long dotting sequence signal detector.

12. The digital data receiver as recited in claim 11, wherein said message processor means further comprises a message word block counter for counting the number of detected message word signals of the digital data frame from the demodulated signals, and for recovering a message word signal from message word signals stored in said message word signal accumulator when the number of the detected message word signals reaches a determined value.

13. A method for recovering at least one message word signal included in a received digital data frame which consists of a plurality of sub-frames, each sub-frame including a given dotting sequence signal, a given word sync signal and a message word signal in which each signal is represented by a plurality of symbols and modulated by frequency in a mobile communication system, wherein a dotting sequence signal of the first sub-frame is longer than dotting sequence signals of the rest of the sub-frames, and the word sync signal and message word signal of each sub-frame consist of the same signal length and pattern, comprising the steps of:

(a) demodulating frequency modulated signals after receiving said frequency modulated signals of the digital data frame, and synchronizing the symbols of the signal;

(b) detecting the dotting sequence signal from the synchronized symbols;

(c) counting the number of synchronized symbols whenever each symbol is inputted after detecting the dotting sequence signal and determining the termination of receiving the digital data frame if the counted number reaches a predetermined value;

(d) in step (c), initializing the counting number of synchronized symbol if a word sync signal is detected prior to reaching the predetermined value;

(e) storing the message word signal of the sub-frame associated with the detection of the dotting sequence when the word sync signal is detected, and returning to the step (d); and (f) recovering the message word signal from the stored message word signals when determining the termination of receiving the digital data frame.

14. A method for recovering at least one message word signal included in a receiving data frame which consist in a plurality of sub frames, each sub-frame including a given dotting sequence signal, a given word sync signal and a message word signal in which each signal is represented by a plurality of symbols and modulated by frequency in a mobile communication system, wherein a dotting sequence signal of the first sub-frame is longer than dotting sequence signals of the rest of the sub-frames, and the word sync signal and message word signal of each sub-frame consist of the same signal length and pattern, comprising the steps of:

(a) demodulating the frequency modulated signals, and synchronizing the symbols of the signals;

(b) detecting the dotting sequence signal from the synchronizing symbols;

(c) detecting the word sync signal after detecting the dotting sequence signal;

(d) detecting the storing the message word signal after detecting the word sync signal of the sub-frame;

(e) counting total sub-frames;

(f) counting the stored message word signals;

(g) returning to (b) if the number of stored message word signal does not reach the number of total sub-frames of the digital data frame and recovering the message word signal from the stored message word signals when the number of stored message word signals reach the number of total sub-frames of the digital data frame.

15. A method for recovering at least one message word signal included in a receiving digital data frame which consist of a plurality of sub frames, each sub-frame including a given dotting sequence signal, a given word sync signal and a message word signal in which each signal is represented by a plurality of symbols and modulated by frequency in a mobile communication system, wherein a dotting sequence signal of the first sub-frame is longer than dotting sequence signals of the rest of the sub-frames, and the word sync signal and message word signal of each sub-frame consist of the same signal length and pattern, comprising the steps of:

(a) storing at least one message word signal of the digital data frame;

(b) detecting the dotting sequence signal of the digital data frame, and then counting the number of symbols whenever each symbol is inputted;

(c) recovering the message word signal from the stored message word signals when symbols corresponding to the dotting sequence signal are continuously detected more than a first specific value that is longer than the dotting sequence signal of the other sub-frames, but shorter than the length of the dotting sequence signal of the first sub-frame of the digital data frame, and then returning to the step (b);

(d) recovering the message word signal from all the detected message word signals when a counting number of the symbols reaches a second specific value, and returning to the step (b), and initializing the counting number of the symbols if the word sync signal of the digital data frame is detected prior to reaching the second specific value;

(e) if the word sync signal is detected, storing the message word signal associated with the detection of the dotting sequence signal of the sub-frame, and increasing the counting number of a message word block by 1; and (f) returning to step (b) if the counting number of the message word block does not reach the second specific value, and after recovering the message word signal from the stored message word signals when the counting number of the message word block reaches the second specific value, and then returning to step (b).

* * * * *